May 16, 1961 P. R. JOHNSTON 2,984,369
WAGON UNLOADING MECHANISM
Original Filed July 26, 1957 2 Sheets-Sheet 1
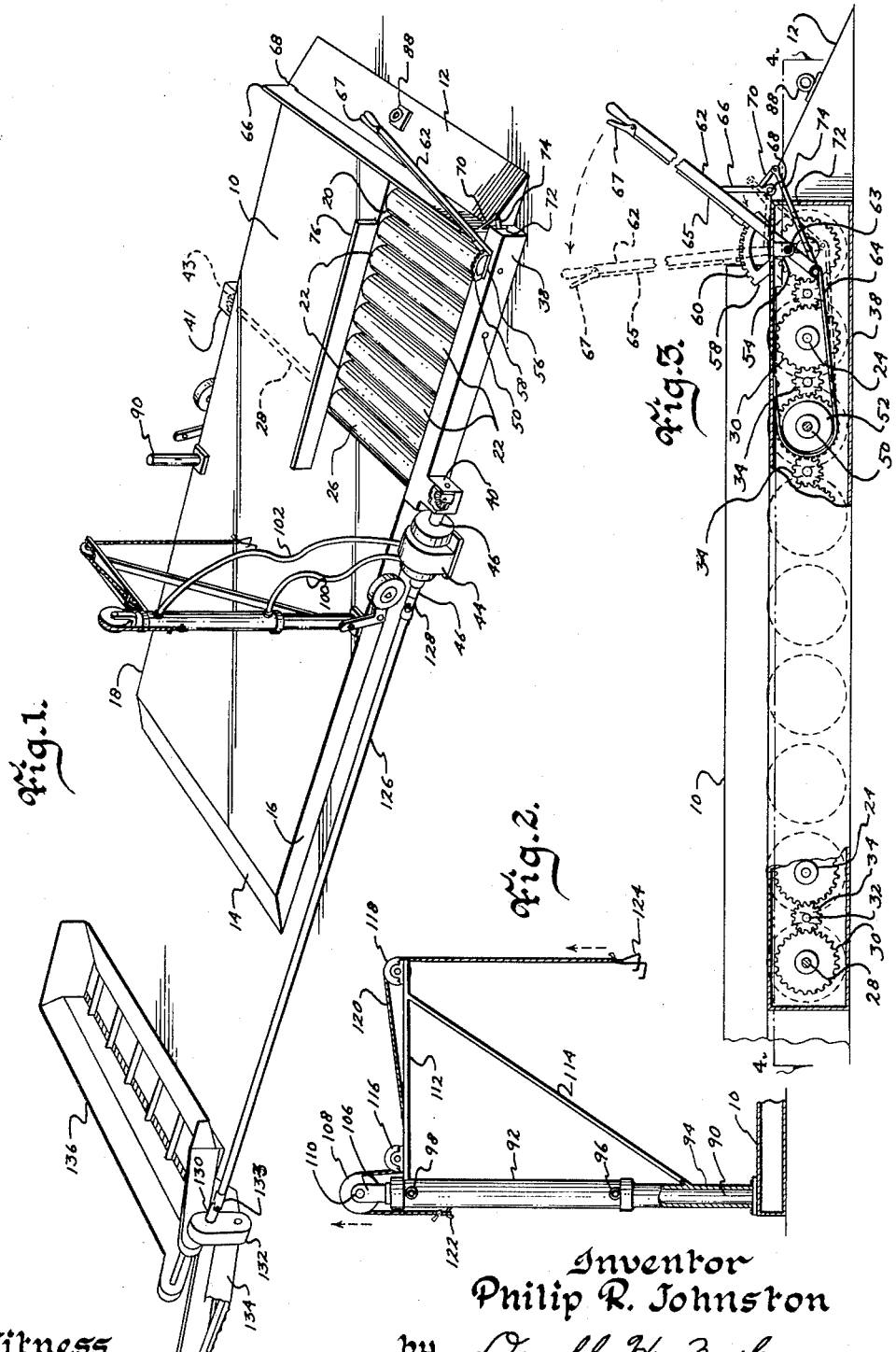
Inventor
Philip R. Johnston
by Donald H. Zarley
Attorney May 16, 1961 P. R. JOHNSTON 2,984,369
WAGON UNLOADING MECHANISM
Original Filed July 26, 1957 2 Sheets-Sheet 2
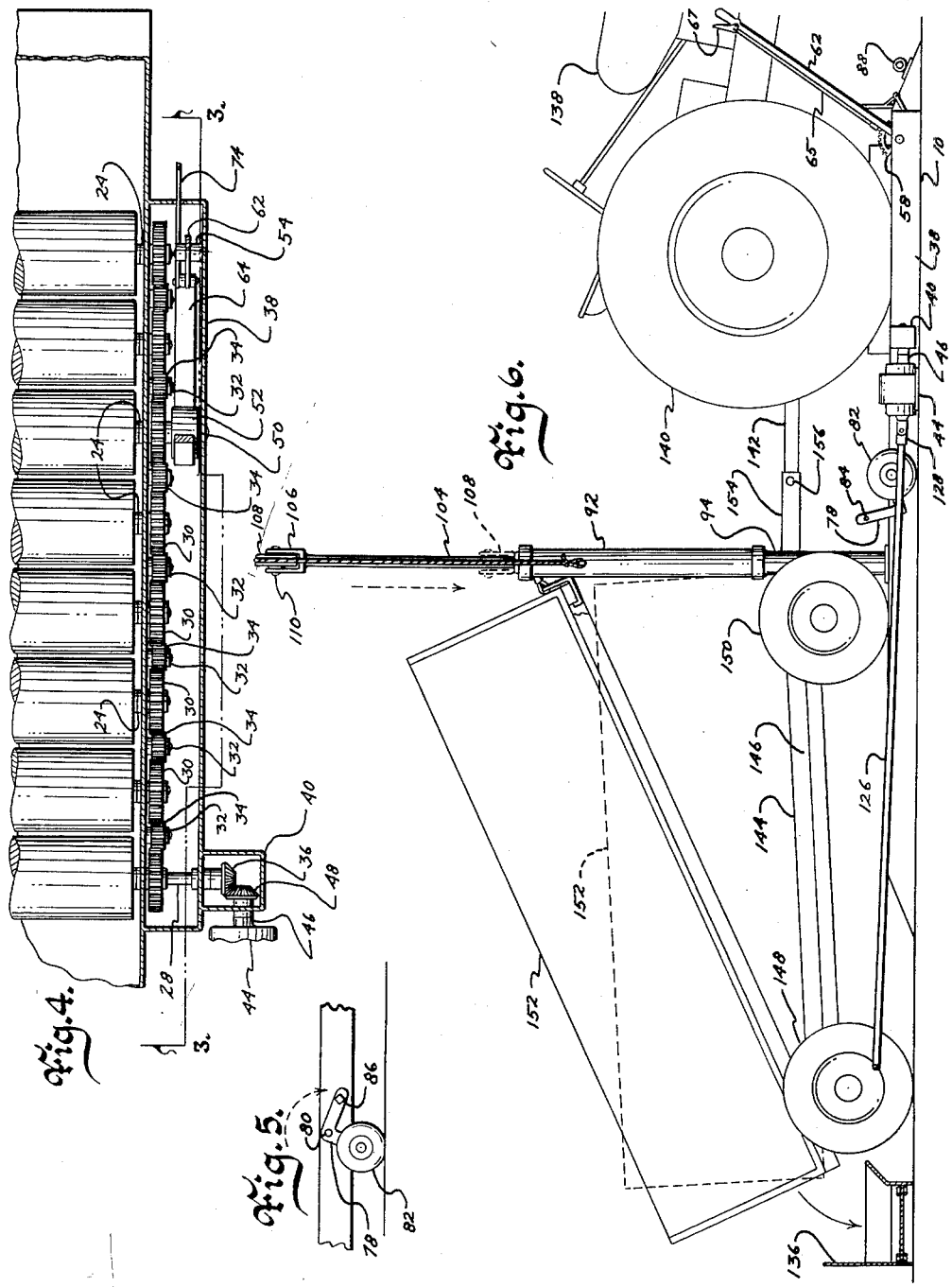
Inventor: Philip R. Johnston
by Donald H. Zarley
Attorney
Witness
Edward P. Seeley United States Patent Office 2,984,369
Patented May 16, 1961

2,984,369

WAGON UNLOADING MECHANISM

Philip R. Johnston, St. Charles, Iowa

Continuation of application Ser. No. 674,432, July 26, 1957. This application Mar. 27, 1959, Ser. No. 802,568

1 Claim. (Cl. 214—64)

This invention is a continuation of my application for United States Letters Patent on a Wagon Unloading Mechanism, Serial No. 674,432, filed July 26, 1957, now abandoned, and relates to wagon unloading equipment and more particularly to wagon unloading equipment which can be operated by the prime mover of the wagon itself.

The unloading of the farm wagon during harvesting season has always been a very realistic problem to the farmer. Today, many hydraulic or mechanical jacks have been made available to the farmer to help him raise the front end of the wagon so that the crop contained therein can be more easily removed from the rearward end of the wagon. Elevators have also been employed to receive and transfer the crop as it is removed from the wagon. However, these jack and elevator devices have not solved all of the wagon unloading problems even though they have greatly alleviated the situation. This is because the jacks and elevators must have a source of power from which to operate, and it is the providing of this source of power that makes the jacks and elevators known to be somewhat of a nuisance, despite their important function. Most farmers pull their loaded wagons to the unloading point with a tractor unit, and then the tractor must be disengaged from the wagon and connected to the jack and/or elevator units to effect the wagon unloading. If the prime mover of the wagon is not so employed, a separate motor or tractor must be standing by to operate the wagon unloading equipment. It is obvious that much time is consumed when the operator of the wagon-pulling tractor must depart from his prime mover and operate the additional power equipment to effect the unloading of the wagon. It is also obvious that the presence of the "standing by" power equipment is a great source of extra expense.

Therefore, the principal object of my invention is to provide a wagon unloading mechanism that can be completely powered by the prime mover of the wagon.

It is a further object of my invention to provide a wagon unloading mechanism that can be powered by the prime mover of the wagon without altering the mechanical relationship of the wagon and prime mover.

It is a still further object of my invention to provide a wagon unloading mechanism that can be completely powered by the prime mover of the wagon without endangering the operator of the prime mover.

It is a still further object of my invention to provide a wagon unloading mechanism that can be completely powered by the prime mover of the wagon at the instantaneous will of the prime mover operator.

It is a still further object of my invention to provide a wagon unloading mechanism that is durable in use, refined in appearance and economical of manufacture.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

Fig. 1 is a perspective view of my device without the wagon and prime mover being present;

Fig. 2 is an elevational view of my hydraulic jack unit;

Fig. 3 is a partial sectional view of my device taken on line 3—3 of Fig. 4, and shows the detailed construction of my rolls, brake and related structure;

Fig. 4 is a sectional view of my device taken on line 4—4 of Fig. 3 and further shows the details of my rolls, brake and related structure;

Fig. 5 is an elevational view of the retractable platform wheel assembly; and

Fig. 6 is a side elevational view of a wagon and tractor on my device with the wagon being in its unloading position.

I have used the numeral 10 to generally designate my platform area having inclined front and rear end portions 12 and 14, respectively, and vertical side portions 16 and 18. A beam 20 can be secured within the platform 10 in any convenient manner and can generally bisect the platform along the longitudinal axis of the platform. A plurality of rolls 22 can be rigidly secured to shafts 24 which extend between and are rotatably mounted on beam 20 and platform side portion 16. As shown in Fig. 1, these rolls 22 are positioned substantially parallel to the front end platform portion 12. The rearmost roll 26 is similar to rolls 22 but it is mounted on shaft 28 which extends through platform side 16, beam 20, and platform side 18. The extension of shaft 28 from beam 20 to side 18 is shown by dotted lines in Fig. 1. Shaft 28 is positioned parallel and in the same spaced relation as shafts 24. The platform 10 is cut away at a point just above rolls 22 and roll 26 and the tops of these rolls are permitted to dwell in the same substantial horizontal plane as platform 10.

Gear members 30 are rigidly secured to the ends of shafts 24 and shaft 28 at a point just outside the side 16 of platform 10. As shown in Fig. 4, stub shafts 32 project outward from the side 16 and are positioned midway between the projecting shafts 24 and projecting shaft 28. Gear members 34 are rigidly secured to each of these stub shafts 32 and gears 34 are adapted to mesh with the adjacent gears 30 to mechanically connect the rolls 22 and roll 26 together.

As shown in Figs. 1 and 4, shaft 28 of roll 26 extends even beyond its gear 30 and bevel gear 36 is rigidly secured thereto in any convenient manner. A housing 38 is connected to platform 10 and extends completely over the gears 30 and 34, and housing 40 surrounds bevel gear 36, as shown in Fig. 4. A bearing member 42 rotatably supports shaft 28 as it projects from housing 38 into housing 40. A hydraulic pump 44 having a drive shaft 46 can be operatively connected to shaft 28, as shown in Fig. 4. In this figure the hydraulic pump drive shaft 46 extends into housing 40 and a bevel gear 48 is rigidly secured to the end of the drive shaft and is adapted to mesh with the bevel gear 36 on shaft 28. The housing 41 shown in Fig. 1 at the end of shaft 28 opposite to housing 40 encloses a second bevel gear 43 which is identical to bevel gear 36. It may be assumed that bevel gear 43 and housing 41 are identical to bevel gear 36 and housing 40 in their relation to shaft 28.

One of the shafts 24 can have a shaft extension 50 thereon which can have its outer end rotatably mounted in housing 38. This arrangement is shown in Figs. 1, 3 and 4. Shaft extension 50 can have a circular drum member 52 rigidly secured thereon. A bearing member 54 can be located adjacent a slot opening 56 in the top of housing 38. The bearing member 54 is preferably located inside housing 38 and a ratchet member 58 having teeth 60 is rigidly secured to the top of housing 38 adjacent slot opening 56. A conventional ratchet lever 62 is pivoted within bearing member 54 by pin 63 and is allowed to have its lower end extend downwardly into housing 38. A rod 65 and handle 67 are secured to ratchet lever 62 in any manner to perform the conventional function of engaging the teeth 60 of ratchet member 58 to selectively hold ratchet lever 62 in a predetermined position. A flexible brake band 64 is secured by one of its ends to the lower end of ratchet lever 62 as shown in Fig. 3, and this brake band extends around drum member 52 on shaft extension 50 and is then rigidly secured in any convenient manner by its other end to the top of housing 38. Brake band 64 is of such length that when the ratchet lever 62 is in the position of the solid lines in Fig. 3, the band will loosely engage drum 52. The position of the lever 62, shown by the dotted lines of Fig. 3 will bring band 64 into frictional engagement with drum 52.

A bumper element 66 is pivotally secured to the forward edge of platform 10 by pins 68. An arm 70 is rigidly secured to one end of bumper 66 and extends forwardly and downwardly therefrom. Housing 38 has an opening 72 in its forward end and linkage member 74 extends therethrough and is pivoted by its ends to the lower end of lever 62 and to the outer end of arm 70. As shown by the solid lines in Fig. 3, the bumper 66 is held in a vertical position by arm 70 and linkage member 74 whenever the lever 62 is in the position of the solid lines. The movement of lever 62 to the position of the dotted lines in Fig. 3 will permit bumper 66 to rotate rearwardly and assume the same horizontal plane as platform 10.

A guide bar 76 can be secured in any convenient manner to beam 20 for a reason to be seen hereafter. L-shaped wheel brackets 78 are pivoted to the sides 16 and 18 of platform 10 by pins 80. As shown in Fig. 5, the L-shaped brackets 78 are pivoted to the platform at a point substantially at the midpoint of the brackets. A wheel member 82 is rotatably secured to one end of the brackets 78 and a hole 84 is located in the opposite end of each bracket. A nut and bolt assembly 86 can be inserted through hole 84 to selectively hold the bracket 78 in a fixed position with respect to platform 10, as shown in Fig. 3. An eyelet 88 can be secured to the front end 12 of platform 10 to be used in towing the platform from place to place.

Vertical stub shafts 90 are rigidly secured to the top of platform 10 adjacent sides 16 and 18 at a point rearwardly of roll 26. A hydraulic jack cylinder 92 has a hollow bottom portion 94 which is adapted to be removably rotatably mounted on either of the stub shafts 90. I have shown hydraulic jack cylinder 92 to be double-acting and having parts 96 and 98 located at its opposite ends. Hydraulic conduits 100 and 102 detachably connect parts 96 and 98, respectively, to hydraulic pump 44. A piston rod 104 is adapted to move through the upper end of hydraulic cylinder jack 92, and a clevis bracket 106 is rigidly secured to the upper end of piston rod 104. A pulley wheel 108 is rotatably mounted within clevis bracket 106 by pin 110. A horizontal arm 112 is rigidly secured to the upper portion of hydraulic cylinder jack 92 and a diagonal brace 114 extends from the lower portion 94 of the cylinder to the outer end of the arm. Pulley wheel 116 is secured to the top of arm 112 adjacent hydraulic cylinder 92 and pulley wheel 118 is similarly positioned on the outward end of the arm. A cable 120 is secured to hydraulic cylinder 92 by pin 122 and is then threaded up over pulley wheel 108, thence down under pulley wheel 116 and thence up over pulley wheel 118. As shown in Fig. 2, a hook member 124 can be tied in any convenient manner to the end of cable 120 that extends up over pulley wheel 118.

Fig. 1 shows that drive shaft 46 of hydraulic pump 44 extends completely through the pump and is thereupon secured to shaft 126 by universal connection 128. Shaft 126 is thereupon connected to shaft 130 of elevator gear box 132 by universal connection 133. Elevator gear box 132 is mechanically secured to the conventional elevator unit 134 and to the conventional folding elevator section 136. The elevator section 136 is capable of being folded upwardly onto elevator unit 134 but since the specific structure of these elevator units does not comprise a part of my invention, their specific structural details have not been shown.

Fig. 6 shows a tractor unit 138 with rear wheels 140 and drawbar 142. A farm wagon 144 with chassis 146, rear wheels 148, front wheels 150, tiltable wagon box 152, and tongue member 154, is secured to the drawbar 142 of tractor 138 by a pin 156 which joins the wagon tongue and tractor drawbar in conventional fashion. The wagon box 152 is shown to be pivoted to the rear end of chassis 146 as are most modern farm wagons.

Having described the detailed structure of my device, I shall now describe its normal operation. The elevator section 136 is folded over upon elevator section 134 so as to provide the tractor 138 and wagon 144 clear access to the rear end 14 of platform 10. The arm 112 on hydraulic cylinder jack 92 is rotated to assume a position parallel to the sides of platform 10. The ratchet lever 62 is moved to the position shown by the dotted lines in Fig. 3. With the ratchet lever 62 in this position, brake band 64 will exert pressure on drum 52 and will thereupon act to prevent the rotation of shaft extension 50 and the roll shaft 24 to which it is secured. Since all of the roll shafts 24 and roll shaft 28 are mechanically connected by gears 30 and 34, the braking effect of drum 52 on its particular roll shaft 24 will prevent any of the rolls 22 or roll 26 from being rotated.

The tractor 138 is then driven onto the rear end 14 of platform 10 to a point where one of the rear wheels of the tractor rests entirely on the rolls 26 or 22 and the front wheels of the wagon rest on platform 10. The position of the tractor and wagon is best determined by stopping the tractor when the front end of the wagon box 152 becomes aligned with vertical stub shafts 90. Obviously, if one rear wheel 140 of tractor 138 rests on the rolls 22 or 26, the other rear wheel must rest on top of platform 10 at a point not on these rolls. After the tractor 138 and wagon 144 have been so positioned, the ratchet lever 62 is moved to the position shown by the solid lines in Fig. 3. This releases the frictional hold of brake band 64 upon drum 52 and leaves the rolls 22 and 26 free to be rotated. As lever 62 releases brake band 64, bumper 66 is elevated to a somewhat vertical position, as shown in Figs. 1, 3 and 6.

The hydraulic jack cylinder 92 is then rotated so that arm 112 extends out in front of wagon box 152 and hook 124 is capable of engaging the front end of the wagon box. The position of the cable 120 on the jack 92 is substantially as shown in Figs. 1 and 2 at this time. The folding elevator section 136 is thereupon rotated downwardly to assume a position underneath the rear end of wagon box 152.

The operator thereupon sets the brake on the rear wheel of his tractor that rests on top of platform 10. The tractor is then placed in gear and the rear wheel 140 which is resting on rolls 22 or roll 26 begins to rotate. Since the rolls 22 and 26 are free to be rotated, the rotating tractor wheel 140 does not move the tractor. As was stated above, the rolls 22 and roll 26 are mechanically connected by gears 30 and 34 and, since only a single gear 34 is between the gears 30 on the respective rolls, all of the rolls will necessarily have to rotate in the same direction. Thus, it makes no difference which rolls support the tractor wheel 140.

The resulting rotation of shaft 28 by roll 26 will permit bevel gear 36 to act upon bevel gear 48 to rotate the drive shaft of hydraulic pump 44. The conduits 100 and 102 on the hydraulic pump 44 can be arranged so that, for example, a forward rotation of the tractor wheel 140 will effect a flow of hydraulic fluid in pump 44 to raise piston rod 104 upward out of hydraulic cylinder 92. As the piston rod 104 moves upwardly, the cable 120 will also move upwardly to raise the hook 124 and the forward end of the wagon box 152. At the same time that the hydraulic pump 44 begins to operate, the drive shaft 46 of the pump will start to rotate shaft 126 to operate the elevator units 134 and 136.

When the wagon box 152 has been tilted to a sufficient angle to discharge the crop into elevator unit 136, the operator may then stop the rotation of tractor wheel 140 and the tilting of the wagon box will immediately cease. The direction of rotation of tractor wheel 140 can thereupon be reversed which will reverse the direction of rotation of rolls 22 and roll 26 and will subsequently lower the piston rod 104 of hydraulic jack 92. It should be definitely understood that various types of hydraulic jacks could be successfully used with my device and that a single-acting hydraulic jack could be used which would eliminate the need for reversing the direction of rotation of the tractor wheel to lower the jack. Furthermore, many conventional hydraulic jacks with a manual by-pass valve could be beneficially used with my device to permit the elevator units 134 and 136 to continue functioning without the drive shaft 46 of hydraulic pump 44 continuing to raise the piston rod 104 of the jack 92.

When the wagon box 152 has been emptied and lowered to its normal position, the tractor wheel 140 is stopped from rotating and the ratchet lever 62 is once again moved to the position shown by the dotted lines in Fig. 3 to lock the rolls 22 and 26 against rotation. Bumper 66 is also moved to a horizontal position by this action. Hydraulic jack 92 is rotated on stub post 90 so that arm 112 is parallel to the sides of platform 10 and the tractor 138 is then free to pull the wagon 144 from the platform. Unless the rolls 22 and 26 were first locked against rotation by lever 62, tractor 138 would still be unable to move from the platform.

The function of the guide bar 76 and bumper 66 are to keep the tractor 138 under control and on the platform if the rolls 22 or 26 ever become jammed while the wheel 140 is rotating to operate the device.

It is apparent that the hydraulic pump 44 can be operated from either end of shaft 28 and that hydraulic jack cylinder 92 could be located at either side of platform 10 by being mounted on either of the stub shafts 90. The connection of the shaft 28 to the hydraulic pump drive shaft 46 is only one way this could be accomplished and many other arrangements could be made such as operating the hydraulic pump 44 at one end of shaft 28 and connecting elevator drive shaft 126 to the other end of shaft 28.

My platform 10 is made completely portable for by moving the L-shaped wheel brackets 78 to the position shown in Fig. 5 and securing the brackets in this position by nut and bolt assemblies 86, the platform is raised from the ground surface and supported by wheels 82.

It should also be noted that by making the platform of such length that the rear wheels 148 of the wagon 144 do not rest on the platform during the unloading operation, the front wheels 150 are necessarily elevated and the hydraulic jack 92 has less elevating of the wagon box 152 to accomplish.

Therefore, it is seen that my invention will accomplish at least all of its stated objectives.

Some changes may be made in the construction and arrangement of my wagon unloading mechanism without departing from the real spirit and purpose of my invention, and it is my intention to cover by my claim, any modified forms of structure or use of mechanical equivalents which may be reasonably included within their scope.

I claim:

In a wagon unloading mechanism, a horizontal platform, a plurality of elongated rolls rotatably mounted on said platform, said elongated rolls being positioned parallel to each other and having their top portions dwelling in substantially the same horizontal plane as the top of said platform, the top of said platform presenting a clear pathway so as to accommodate vehicles having different wheel widths, a jack member secured to said platform, brake means operatively secured to said elongated rolls for selectively holding them against rotation, a collapsible bumper element pivoted to the front end of said platform and operatively connected to said brake means to project from said platform whenever said brake means releases said elongated rolls for rotation, and means operatively connecting said elongated rolls with said jack member so that the rotation of said elongated rolls will actuate said jack member.

References Cited in the file of this patent

UNITED STATES PATENTS

| | | |
|---|---|---|
| 1,161,982 | Scheidler | Nov. 30, 1915 |
| 1,275,450 | Leprevost | Aug. 13, 1918 |
| 1,444,704 | Petteys | Feb. 6, 1923 |
| 1,879,607 | Fitch | Sept. 27, 1932 |
| 2,042,573 | Wood et al. | June 2, 1936 |
| 2,538,517 | Hayden | Jan. 16, 1951 |
| 2,796,952 | Brumby | June 25, 1957 |
| 2,797,006 | Thompson | June 25, 1957 |

FOREIGN PATENTS

| | | |
|---|---|---|
| 157,733 | Australia | Jan. 14, 1954 |
| 379,122 | Great Britain | Aug. 25, 1932 |
| 614,125 | Great Britain | Dec. 9, 1948 |
| 885,429 | France | Sept. 14, 1952 |